United States Patent [19]

Boothe et al.

[11] 4,012,327

[45] Mar. 15, 1977

[54] THICKENED ALCOHOL WELL TREATING COMPOSITIONS

[75] Inventors: Jerry Emile Boothe, Coraopolis; Fred David Martin, McMurray, both of Pa.

[73] Assignee: Calgon Corporation, Pittsburgh, Pa.

[22] Filed: Feb. 12, 1975

[21] Appl. No.: 549,397

[52] U.S. Cl. .......................... 252/8.55 R; 166/283; 166/308; 252/316

[51] Int. Cl.$^2$ ........................................ E21B 43/26

[58] Field of Search ...................... 252/8.55 R, 316; 166/283, 308

[56] References Cited

UNITED STATES PATENTS

| | | | |
|---|---|---|---|
| 2,328,901 | 9/1943 | Grimm et al. | 260/72 |
| 3,310,112 | 3/1967 | Nielsen et al. | 166/283 X |
| 3,539,535 | 11/1970 | Wisner | 260/72 |
| 3,661,880 | 5/1972 | Markert et al. | 526/62 |
| 3,696,035 | 10/1972 | Nimerick | 166/308 X |
| 3,779,914 | 12/1973 | Nimerick | 252/8.55 |

OTHER PUBLICATIONS

Buchley, et al., Article in the Oil and Gas Journal, Sept. 17, 1973, pp. 84–88.

*Primary Examiner*—Herbert B. Guynn
*Attorney, Agent, or Firm*—Rudolph J. Anderson, Jr.; Harry E. Westlake, Jr.; Raymond M. Speer

[57] ABSTRACT

Alcohols, particularly anhydrous alcohols, thickened with aminomethylated polyacrylamide, used as fracturing fluids for stimulating well production.

8 Claims, No Drawings

THICKENED ALCOHOL WELL TREATING COMPOSITIONS

BACKGROUND OF THE INVENTION

The present invention relates to compositions and a method for the hydraulic fracturing of subterranean formations penetrated by a well. Particularly, the present invention relates to the use of alcohols, especially anhydrous alcohols, thickened with aminomethylated polyacrylamide as hydraulic fracturing fluids.

Hydraulic fracturing is an extensively employed method for stimulating the production of petroleum and natural gas from subterranean formations. The method generally involves contacting the subterranean well formation with the fracturing fluid, applying sufficient pressure to the fracturing fluid to open a fracture in the subterranean formation, and maintaining this pressure while injecting the fracturing fluid into the fracture at a sufficient rate to extend the fracture into the subterranean form.

It is desired that the fracturing fluid be viscous in nature since this will permit the fracturing fluid to remain in the fracture long enough to permit buildup and maintenance of sufficient pressure to open a fracture. Moreover, a viscous fracturing fluid is capable of supporting propping agents, which are particulated solids suspended in the fracturing fluid for the purpose of maintaining the fracture in an open condition, by being deposited in the fracture once created. Generally, it is desired that the fracturing fluid have a viscosity of at least about 25 centipoises, as measured by Fann Model 35 Viscometer at 26° C. and at 100 r.p.m., for a 1.0% by weight concentration of thickening agent.

While a variety of base liquids have been employed in fracturing fluids, including water, crude oil and kerosene, alcohols have recently been employed as such base liquids, particularly in the fracturing of formations producing natural gas. Since it has been recognized that water often reduces the permeability of the particular subterranean formations involved, and can itself block access of the gas to the well bore, it has become desirable to employ anhydrous alcohols; that is, alcohols which are substantially devoid of water, as fracturing fluid base liquids.

Many materials currently available for gelling alcohols require that a significant amount of water be present in the alcohol in order for thickening to occur. Thus, the use of alcohol-water gels as fracturing fluids is often encountered. However, in view of the undesirable aspects of using water discussed above, a definite need exists in the art for materials that will thicken or gel anhydrous alcohols.

However, notwithstanding the preferred use of the thickening agents of the present invention to thicken anhydrous alcohols, they may also be successfully employed to thicken or gel mixtures of alcohols and water, in virtually all proportions of the components, where use of alcohol and water fracturing fluids is not subject to some of the disadvantages discussed above.

Polyacrylamide has been suggested as a composition suitable for gelling a number of different fracturing fluids, including alcohols. See U.S. Pat. No. 3,310,112.

SUMMARY OF THE INVENTION:

The aminomethylated polyacrylamide thickening agents of the present invention may be represented as containing repeating units of the following general formula:

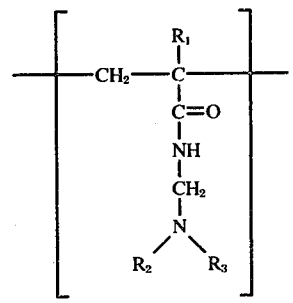

where $R_1$ may be hydrogen or methyl; and where $R_2$ and $R_3$ are each independently selected from alkyl radicals of one to five carbon atoms.

The preferred thickening agent of the present invention is dimethylaminomethyl polyacrylamide.

The aminomethylated polyacrylamide thickening agents of the present invention may be prepared by conventional solution polymerization methods, such as those described in U.S. Pat. No. 2,328,901 and in Schiller et al., "*Ionic Derivatives of Polyacrylamide,*" Ind. and Eng. Chem. 49, 2132 (1956). However, the aminomethylated polyacrylamide materials may be prepared by other methods. It has been found that polyacrylamide aminomethylated in an inverse emulsion environment, as described in copending application Ser. No. 514,866, which is incorporated herein by reference, is particularly useful, producing excellent thickening of alcohols.

The thickening agents of the present invention are useful over a wide range of molecular weights, from as little as about 5,000 to as much as several hundred thousand to 1 million or more. The molecular weight utilized will be determined by a number of factors, but generally the higher molecular weight materials will produce proportionately more thickening of the alcohol base liquid, which is ordinarily desired.

The thickening agents of the present invention may be employed satisfactorily in concentration amounts as low as 0.5 percent by weight of the alcohol base liquid being thickened. Higher concentrations of 10 percent by weight or more may be employed, but the range of concentration amounts will ordinarily be from about 1.0 to about 5.0 percent by weight. As with molecular weight of the aminomethylated polyacrylamide thickening agents of the present invention, the concentration of the thickening agent which is desired will depend on a number of factors, but especially upon the viscosity of the final thickened alcohol composition which is desired.

The thickening agents of the present invention may be employed in combination with materials which are recognized cross-linking agents for aminomethylated polyacrylamides, for example, formaldehyde. It will be readily appreciated that such cross-linking of the aminomethylated polyacrylamide thickening agents of the present invention will materially increase the thickening or viscosity increasing effectiveness of the thickening agents of the present invention.

The aminomethylated polyacrylamide thickening agents of the present invention effectively thicken or gel a number of alcohols. Such alcohols are of the general formula:

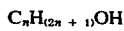

where $n$ is an integer of from 1 to 5. Included in such alcohols are methanol, ethanol, n-propanol, isopropanol, n-butanol, tert-butanol, n-pentanol, 3-methyl-1-butanol, and 1-ethyl-1-propanol, among others. Since considerable quantities of alcohol are required in the conventional fracturing operation, considerations of economics will ordinarily govern choice of the particular alcohol to be employed. Methanol, for example, would frequently be the alcohol of choice.

An important improvement of the aminomethylated polyacrylamide thickening agents of the present invention is their ability to thicken or gel anhydrous alcohols. The value of employing anhydrous alcohols in a fracturing operation has already been discussed. The term "anhydrous" is intended to include alcohols with a relatively insignificant amount of water dissolved therein, up to about 5% by weight, as well as alcohols completely free of any water content.

In accordance with the present invention the aminomethylated polyacrylamide compositions operate as thickening agents for alcohols in that when added to the alcohol in an effective concentration amount, they produce an increase in the viscosity of the alcohol. The increase in viscosity may be extensive enough to produce a gel, although this is not essential.

The alcohol liquid base fracturing fluids with which the aminomethylated polyacrylamide thickening agents of the present invention are employed can also contain fluid loss control additives, surfactants, propping agents and clay control chemicals which are compatible with the thickening agents of the present invention.

The following examples illustrate the ability of the aminomethylated polyacrylamide thickening agents of the present invention to increase the viscosity of alcohols.

EXAMPLE 1

The thickening agent evaluated was dimethylaminomethyl polyacrylamide (AMPAM), as a 5% aqueous solution. The composition was added to reagent grade anhydrous methanol in amount sufficient to give a 0.5 percent by weight concentration. The resultant test samples were subjected to viscosity determinations using a Brookfield Model LVT Viscometer, Spindle No. 1, at the r.p.m's indicated in the table of values below, and at 26° C. The results of the determinations are illustrated in the following table of values:

| Brookfield Viscosities for AMPAM Thickened Anhydrous Methanol - 0.5% by Weight | |
|---|---|
| r.p.m. | Viscosity (cps) |
| 1.5 | 44 |
| 3 | 34 |
| 6 | 31 |
| 12 | 30 |
| 30 | 27.8 |
| 60 | 26.0 |

EXAMPLE 2

AMPAM was again employed as the thickening agent, but at 1.0 percent by weight concentration, using a 5% aqueous solution. The other conditions and apparatus were the same as for the determinations described in Example 1 above. The results of the determinations are illustrated in the following table of values:

| Brookfield Viscosities for AMPAM Thickened Anhydrous Methanol - 1.0% by Weight | |
|---|---|
| r.p.m. | Viscosity (cps) |
| 0.3 | 320 |
| 0.6 | 240 |
| 1.5 | 204 |
| 3 | 200 |
| 6 | 188 |
| 12 | 171.5 |
| 30 | 137.4 |

EXAMPLE 3

AMPAM was used to thicken anhydrous methanol. A 5% aqueous solution of the thickening agent was employed in an amount sufficient to give a 1.0 percent by weight concentration in the methanol. Viscosity determinations were made using a Fann Model 35 Viscometer, at 26° C. and at the r.p.m.'s indicated in the table of values below. The results of the determinations are illustrated in the table of values below:

| Fann Viscosities for AMPAM Thickened Anhydrous Methanol - 1.0% by Weight | |
|---|---|
| r.p.m. | Fann Viscosity (cps) |
| 100 | 44.4 |
| 200 | 32.7 |
| 300 | 21.8 |
| 600 | 20.3 |
| Blank* | |

*Blank was methanol at 600 r.p.m.

EXAMPLE 4

The evaluation procedures of Example 3 above were repeated, but the AMPAM thickening agent employed was prepared by aminomethylation of polyacrylamide in an inverse emulsion environment. The material was added to the methanol in amounts sufficient to give 2.8% and 4.0% by weight concentrations. The results of the determinations are illustrated in the table of values below:

| Fann Viscosities for Emulsion-AMPAM Thickened Anhydrous Methanol | |
|---|---|
| | 2.8% by Weight Concentration |
| r.p.m. | Fann Viscosity (cps) |
| 100 | 171 |
| 200 | 113 |
| 300 | 92.5 |
| 600 | 65 |
| | 4.0% by Weight Concentration |
| r.p.m. | Fann Viscosity (cps) |
| 100 | 69 |
| 200 | 48 |
| 300 | 39.8 |
| 600 | 28.75 |

What we claim is:

1. A method of fracturing a subterranean formation comprising:
    a. contacting said formation with a substantially anhydrous alcohol base fracturing fluid comprising one or more substantially anhydrous alcohols of the formula:

where $n$ is an integer of 1 to 5; said substantially anhydrous alcohols containing from 0 to about 5 percent by weight of water;

and as a thickening agent therefor, at least 0.5 percent by weight of the alcohol of a composition containing repeating units of the formula:

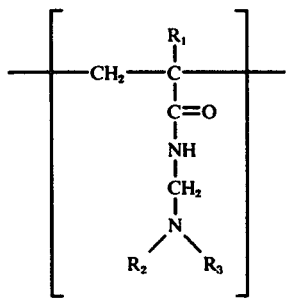

where $R_1$ is hydrogen or methyl, and $R_2$ and $R_3$ are each independently selected from alkyl radicals of one to five carbon atoms; and wherein the molecular weight of said composition is at least about 5,000;

b. applying sufficient pressure to the said fracturing fluid to fracture said formation; and c. maintaining said pressure while forcing said fracturing fluid into said fracture.

2. The method of claim 1 wherein the thickening agent is dimethylaminomethyl polyacrylamide.

3. The method of claim 1 wherein the alcohol is methanol.

4. The method of claim 3 wherein the alcohol is isopropanol.

5. A substantially anhydrous alcohol base fracturing fluid composition for use in fracturing subterranean formations comprising:

a. one or more substantially anhydrous alcohols of the formula:

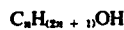

where $n$ is an integer of 1 to 5; said substantially anhydrous alcohols containing from 0 to about 5 percent by weight of water; and b. at least 0.5 percent by weight of the alcohol of a thickening agent composition containing repeating units of the formula:

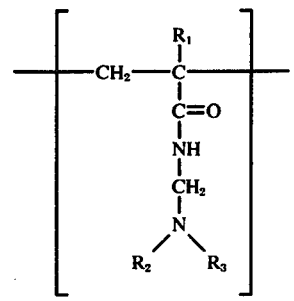

where $R_1$ is hydrogen or methyl, and $R_2$ and $R_3$ are each independently selected from alkyl radicals of one to five carbon atoms; and wherein the molecular weight of said composition is at least about 5,000.

6. The composition of claim 5 wherein the alcohol is methanol.

7. The composition of claim 5 wherein the alcohol is isopropanol.

8. A method of thickening one or more substantially anhydrous alcohols for use in fracturing the subterranean formations, said alcohols being of the formula:

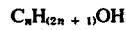

where $n$ is an integer of 1 to 5, said substantially anhydrous alcohols containing from 0 to about 5 percent by weight of water; comprising adding thereto at least 0.5 percent by weight of the alcohol of a thickening agent composition containing repeating units of the formula:

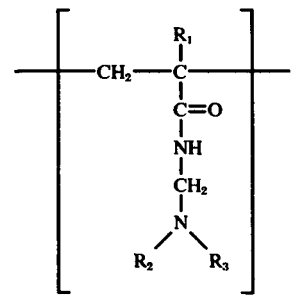

where $R_1$ is hydrogen or methyl, and $R_2$ and $R_3$ are each independently selected from alkyl radicals of one to five carbon atoms; and wherein the molecular weight of said composition is at least about 5,000;

whereby said substantially anhydrous alcohols are thickened.

* * * * *